United States Patent
Zhao

(10) Patent No.: US 11,169,418 B1
(45) Date of Patent: Nov. 9, 2021

(54) LIQUID CRYSTAL ALIGNMENT DEVICE AND OPERATION METHOD THEREOF

(71) Applicant: TCL China Star Optoelectronics Technology Co., Ltd., Shenzhen (CN)

(72) Inventor: Rentang Zhao, Shenzhen (CN)

(73) Assignee: TCL China Star Optoelectrenics Technology Co., Ltd., Shenzhen (CN)

( * ) Notice: Subject to any disclaimer, the term of this patent is extended or adjusted under 35 U.S.C. 154(b) by 164 days.

(21) Appl. No.: 16/627,787

(22) PCT Filed: Dec. 19, 2019

(86) PCT No.: PCT/CN2019/126457
§ 371 (c)(1),
(2) Date: Dec. 31, 2019

(87) PCT Pub. No.: WO2021/103212
PCT Pub. Date: Jun. 3, 2021

(30) Foreign Application Priority Data

Nov. 26, 2019 (CN) .......................... 201911176259.0

(51) Int. Cl.
*G02F 1/1335* (2006.01)
*G02F 1/1337* (2006.01)

(52) U.S. Cl.
CPC .............................. *G02F 1/133788* (2013.01)

(58) Field of Classification Search
CPC .................................................. G02F 1/133788
See application file for complete search history.

(56) References Cited

U.S. PATENT DOCUMENTS

| | | | |
|---|---|---|---|
| 9,013,659 B2* | 4/2015 | Chiu ................. | G02F 1/133788 349/123 |
| 9,366,908 B2* | 6/2016 | Xiong ............... | G02F 1/133753 |
| 9,733,523 B2* | 8/2017 | Lee .................... | G02F 1/133788 |
| 2008/0055521 A1* | 3/2008 | Mizutani .............. | G02B 5/3016 349/96 |
| 2015/0227006 A1* | 8/2015 | Shimada ........... | G02F 1/133788 438/23 |
| 2015/0277191 A1* | 10/2015 | Sato ................... | G02F 1/133788 250/492.1 |
| 2016/0291415 A1* | 10/2016 | Zhao .................... | G02B 6/0055 |
| 2019/0086697 A1* | 3/2019 | Tomimaru ........ | G02F 1/133788 |

* cited by examiner

*Primary Examiner* — Hoan C Nguyen

(57) ABSTRACT

The present invention provides a liquid crystal alignment device and a method of operating the same. The liquid crystal alignment device includes: a stage; a plurality of slide rails aligned parallel to each other, extending in a first direction and arranged above the stage; and a plurality of ultraviolet lamp tubes aligned parallel to each other and extending in a second direction, and opposite ends of a long axis of each of the plurality of ultraviolet lamp tubes are respectively installed on any two of the plurality of slide rails through the plurality of rollers, such that the plurality of ultraviolet lamp tubes have adjustable intervals in the first direction, wherein the second direction and the first direction are perpendicular to each other.

16 Claims, 3 Drawing Sheets

LIQUID CRYSTAL ALIGNMENT DEVICE AND OPERATION METHOD THEREOF

RELATED APPLICATIONS

This application is a National Phase of PCT Patent Application No. PCT/CN2019/126457 having International filing date of Dec. 19, 2019, which claims the benefit of priority of Chinese Patent Application No. 201911176259.0 filed on Nov. 26, 2019. The contents of the above applications are all incorporated by reference as if fully set forth herein in their entirety.

FIELD AND BACKGROUND OF THE INVENTION

The present invention relates to a liquid crystal alignment device and a method of operating the same, and in particular, to a liquid crystal ultraviolet alignment device with controllable illumination and a method of operating the same.

DESCRIPTION OF PRIOR ART

In thin film transistor liquid crystal device (TFT-LCD) related technologies, an alignment process requires a use of an ultraviolet alignment device, whose intensity of ultraviolet light is an important factor affecting the alignment, and the intensity of the ultraviolet light required by liquid crystal materials of different systems is different. An ordinary TV panel requires an UV illumination of only a few tens of $mW/cm^2$, but a panel of smart window series requires an UV illumination of a few hundred $mW/cm^2$ or more. An existing UV alignment device cannot meet the both requirements. As shown in FIG. 1 and FIG. 2, the existing ultraviolet alignment device 100 includes a stage 11 for carrying a panel 10 to be aligned, and a plurality of lamp tubes 13 are fixed on a lamp holder 12 and cannot be moved. Therefore, only a small range of illuminance can be adjusted by adjusting voltages of the plurality of lamp tubes 13. As such, if the both types of products are produced at the same time in a production room, two ultraviolet alignment devices with different illuminances need to be configured, resulting in a high cost in production and operation.

In order to solve the problem that the conventional liquid crystal alignment device cannot meet the required illuminations of various products, there is an urgent need to develop a liquid crystal alignment device with controllable illumination.

SUMMARY OF THE INVENTION

In view of this, the present invention provides a liquid crystal ultraviolet alignment device with controllable illuminance and an operation method thereof. By setting adjustable and movable lamp tubes in the ultraviolet alignment device, and by controlling movements of the lamp tubes, intervals between the lamp tubes can be changed to adjust an intensity the illuminance, thereby complying with different illuminations required by different production conditions, and a variety of production requirements can be achieved with one device, thus saving operating costs.

According to an embodiment of the present invention, the present invention provides a liquid crystal alignment device, including: a stage configured to carry a liquid crystal substrate; a plurality of slide rails aligned parallel to each other, extending in a first direction and arranged above the stage; a plurality of rollers respectively installed on the plurality of slide rails; and a plurality of ultraviolet lamp tubes aligned parallel to each other and extending in a second direction, wherein opposite ends of a long axis of each of the plurality of ultraviolet lamp tubes are respectively installed on any two of the plurality of slide rails through the plurality of rollers, such that the plurality of ultraviolet lamp tubes have adjustable intervals in the first direction, wherein the second direction and the first direction are perpendicular to each other; the plurality of ultraviolet lamp tubes are aligned parallel to each other, extend in the second direction, and are arranged in parallel at a plurality of different intervals in the first direction; the plurality of slide rails are an even number of slide rails, wherein adjacent even-numbered ones of the slide rails constitute a first pair of the slide rails, and adjacent odd-numbered ones of the slide rails constitute a second pair of the slide rails, such that a plurality of pairs of the slide rails aligned parallel to each other and extending in the first direction are defined; and the opposite ends of the long axis of each of the plurality of ultraviolet lamp tubes are respectively installed on any one of the first pair of the adjacent even-numbered ones of the slide rails and the second pair of the adjacent odd-numbered ones of the slide rails through the plurality of rollers.

In an embodiment of the present invention, the plurality of ultraviolet lamp tubes are divided into a plurality of groups, and the plurality of groups are installed in a one-to-one correspondence on the plurality of pairs of the adjacent even-numbered ones of slide rails and the adjacent odd-numbered ones of the slide rails.

In an embodiment of the present invention, the even-numbered ones of slide rails and the odd-numbered ones of slide rails are staggered with each other along the first direction.

In an embodiment of the present invention, adjacent ends of ultraviolet lamp tubes in two adjacent ones of the groups are staggered with each other.

In an embodiment of the present invention, the plurality of ultraviolet lamp tubes are divided into at least a first group and a second group, the plurality of ultraviolet lamp tubes of the first group and the plurality of ultraviolet lamp tubes of the second group are respectively installed between different pairs of the adjacent even-numbered ones of the slide rails and the adjacent odd-numbered ones of the slide rails, and the plurality of ultraviolet lamp tubes of the first and second groups extend in the first direction and aligned parallel to each other in the second direction.

In an embodiment of the present invention, the liquid crystal alignment device further includes: an electric motor configured to move the plurality of ultraviolet lamp tubes.

According to an embodiment of the present invention, the present invention further provides a liquid crystal alignment device, including a stage configured to carry a liquid crystal substrate; a plurality of slide rails aligned parallel to each other, extending in a first direction and arranged above the stage; a plurality of rollers respectively installed on the plurality of slide rails; and a plurality of ultraviolet lamp tubes aligned parallel to each other and extending in a second direction, and opposite ends of a long axis of each of the plurality of ultraviolet lamp tubes are respectively installed on any two of the plurality of slide rails through the plurality of rollers, such that the plurality of ultraviolet lamp tubes have adjustable intervals in the first direction, wherein the second direction and the first direction are perpendicular to each other.

In an embodiment of the present invention, the plurality of ultraviolet lamp tubes aligned parallel to each other, extend in the second direction, and are arranged in parallel at a plurality of different intervals in the first direction.

In an embodiment of the present invention, the plurality of slide rails are an even number of slide rails, adjacent even-numbered ones of the slide rails constitute a first pair of the slide rails, and adjacent odd-numbered ones of the slide rails constitute a second pair of the slide rails, such that a plurality of pairs of the slide rails aligned parallel to each other and extending in the first direction are defined; and wherein the opposite ends of the long axis of each of the plurality of ultraviolet lamp tubes are respectively installed on any one of the first pair of the adjacent even-numbered ones of the slide rails and the second pair of the adjacent odd-numbered ones of the slide rails through the plurality of rollers.

In an embodiment of the present invention, the plurality of ultraviolet lamp tubes are divided into a plurality of groups, and the plurality of groups are installed in a one-to-one correspondence on the plurality of pairs of the adjacent even-numbered ones of slide rails and the adjacent odd-numbered ones of the slide rails.

In an embodiment of the present invention, the even-numbered ones of slide rails and the odd-numbered ones of slide rails are staggered with each other along the first direction.

In an embodiment of the present invention, wherein adjacent ends of ultraviolet lamp tubes in two adjacent ones of the groups are staggered with each other.

In an embodiment of the present invention, the plurality of ultraviolet lamp tubes are divided into at least a first group and a second group, the plurality of ultraviolet lamp tubes of the first group and the plurality of ultraviolet lamp tubes of the second group are respectively installed between different pairs of the adjacent even-numbered ones of the slide rails and the adjacent odd-numbered ones of the slide rails, and the plurality of ultraviolet lamp tubes of the first and second groups extend in the first direction and aligned parallel to each other in the second direction.

In an embodiment of the present invention, the liquid crystal alignment device further includes: an electric motor configured to move the plurality of ultraviolet lamp tubes.

According to another embodiment of the present invention, the present invention further provides a method of operating the liquid crystal alignment device, including: adjusting the plurality of ultraviolet light tubes to have at least a first interval in the first direction when the liquid crystal substrate is required to be irradiated with the ultraviolet lamp tubes of a first illuminance for liquid crystal alignment; and adjusting the plurality of ultraviolet light tubes to have at least a second interval in the first direction when the liquid crystal substrate is required to be irradiated with the ultraviolet lamp tubes of a second illuminance for liquid crystal alignment, wherein when the first illuminance is greater than the second illuminance, the first interval is smaller than the second interval, and when the first illuminance is less than the second illuminance, the first interval is greater than the second interval.

In an embodiment of the present invention, the method of operating the liquid crystal alignment device includes: adjusting the plurality of ultraviolet light tubes corresponding to the liquid crystal substrate to have the first interval in the first direction, and adjusting the plurality of ultraviolet light tubes non-corresponding to the liquid crystal substrate to have a third interval when the liquid crystal substrate is required to be irradiated with the ultraviolet lamp tubes of the first illuminance for liquid crystal alignment; and adjusting the plurality of ultraviolet light tubes to have the second interval in the first direction when the liquid crystal substrate is required to be irradiated with the ultraviolet lamp tubes of the second illuminance for liquid crystal alignment, wherein the first illuminance is less than the second illuminance, and the first interval is greater than each of the second interval and the third interval In view of this, the present invention provides a liquid crystal ultraviolet alignment device with controllable illuminance and an operation method thereof. By setting adjustable and movable lamp tubes in the ultraviolet alignment device, and by controlling movements of the lamp tubes, intervals between the lamp tubes can be changed to adjust an intensity the illuminance, thereby complying with different illuminations required by different production conditions, and a variety of production requirements can be achieved with one device, thus saving operating costs.

BRIEF DESCRIPTION OF THE SEVERAL VIEWS OF THE DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DESCRIPTION OF SPECIFIC EMBODIMENTS OF THE INVENTION

In order to make the above description of the present invention more comprehensible, the preferred embodiments are described below in detail with reference to the accompanying drawings.

The following description of the various embodiments is provided to illustrate the specific embodiments of the present invention. The spatially relative directional terms mentioned in the present invention, such as "upper", "lower", "before", "after", "left", "right", "inside", "outside", "side", etc. and the like, may be used herein for ease of description to describe one element or feature's relationship to another element(s) or feature(s) as illustrated in the figures which are merely references. The spatially relative terms are intended to encompass different orientations in addition to the orientation as depicted in the figures.

The present invention provides a liquid crystal ultraviolet alignment device with controllable illuminance and an operation method thereof. By setting adjustable and movable lamp tubes in the ultraviolet alignment device, and by controlling movements of the lamp tubes, intervals between the lamp tubes can be changed to adjust an intensity the illuminance, thereby complying with different illuminations required by different production conditions, and a variety of production requirements can be achieved with one device, thus saving operating costs.

Figure 1:
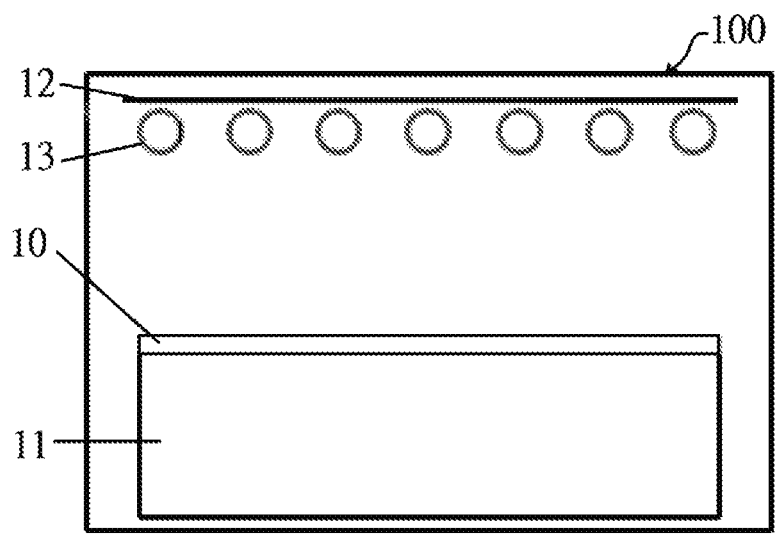
FIG. 1 is a schematic diagram of a conventional liquid crystal alignment device.
Figure 2:
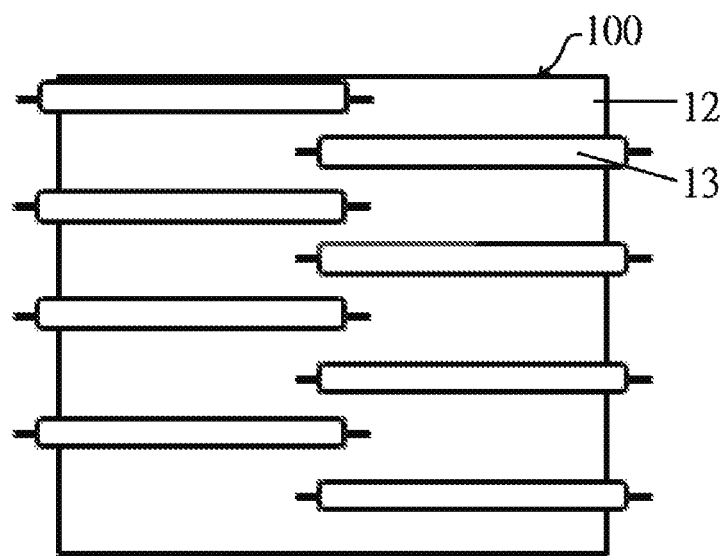
FIG. 2 is a layout diagram of lamp tubes in a conventional liquid crystal alignment device.
Figure 3:
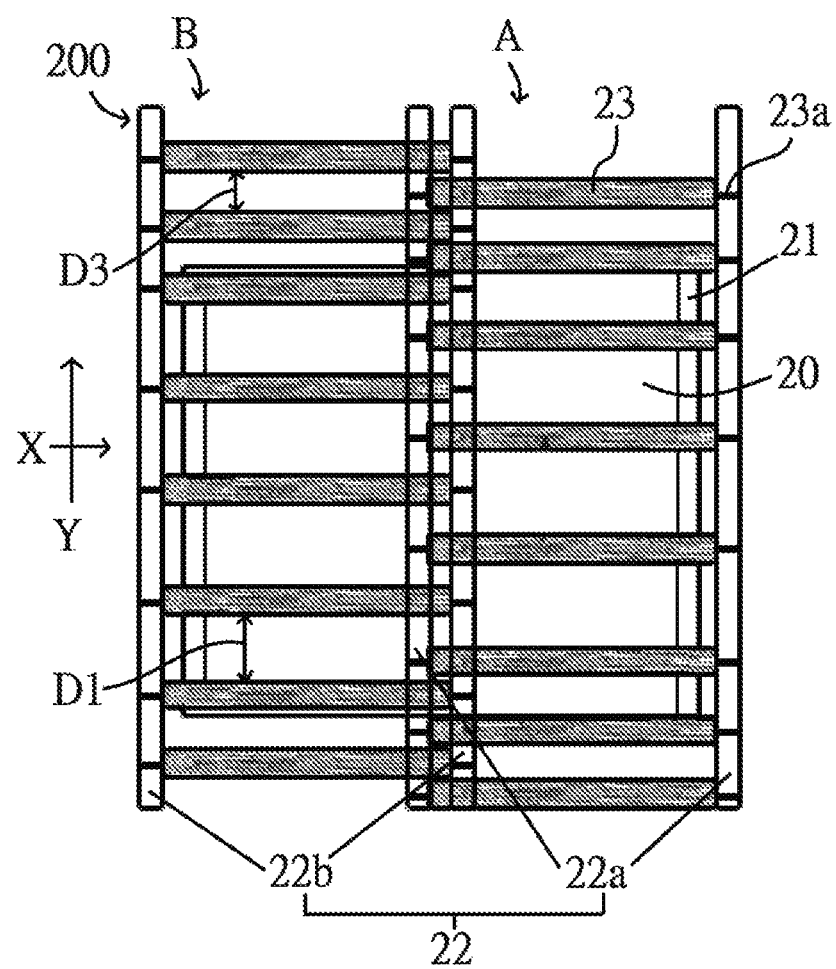
FIG. 3 is a schematic diagram of a liquid crystal alignment device according to an embodiment of the present invention.
Figure 4:
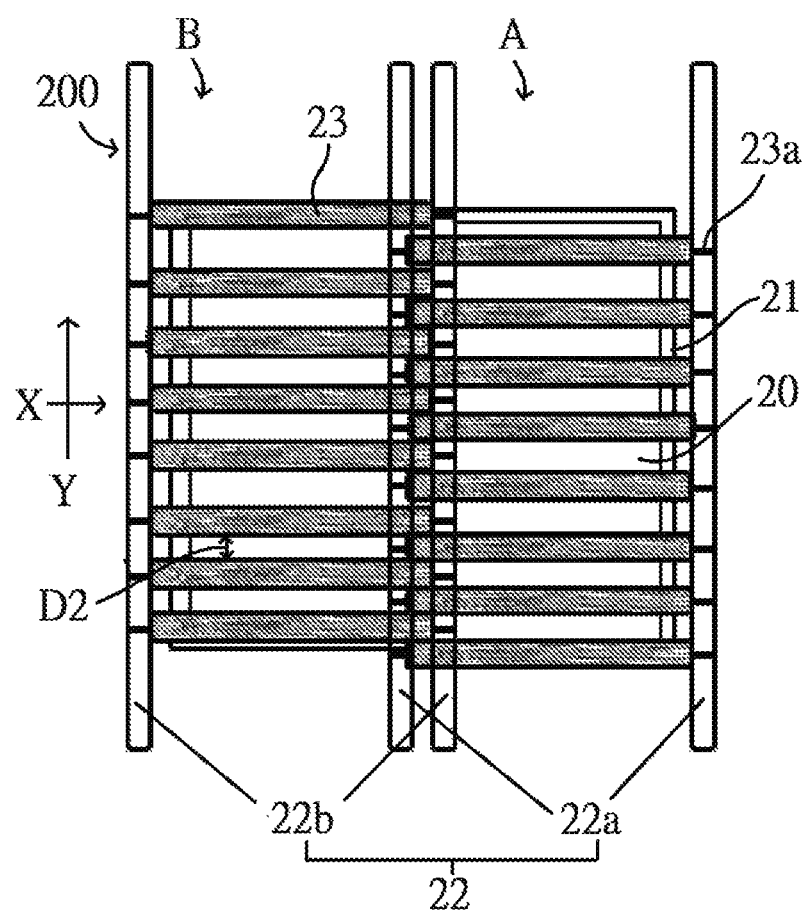
FIG. 4 is a schematic diagram of a liquid crystal alignment device according to another embodiment of the present invention.

According to an embodiment of the present invention, the present invention provides a liquid crystal alignment device, as shown in FIGS. 3 and 4. FIG. 3 is a schematic diagram of a liquid crystal alignment device according to an embodiment of the present invention. FIG. 4 is a schematic diagram of a liquid crystal alignment device according to another embodiment of the present invention. As shown in FIG. 3 and FIG. 4, specifically, the liquid crystal alignment device 200 provided by the embodiment of the present invention includes: a stage 21 configured to carry a liquid crystal substrate 20; a plurality of slide rails 22 aligned parallel to each other, extending in a first direction Y and arranged above the stage 21; a plurality of rollers 23a respectively installed on the plurality of slide rails 22; and a plurality of ultraviolet lamp tubes 23 aligned parallel to each other and extending in a second direction X, wherein opposite ends of a long axis of each of the plurality of ultraviolet lamp tubes 23 are respectively installed on any two of the plurality of slide rails 22 through the plurality of rollers 23a, such that the plurality of ultraviolet lamp tubes 23 have adjustable intervals in the first direction Y, wherein the second direction X and the first direction Y are perpendicular to each other.

As shown in FIG. 3 and FIG. 4, in an embodiment of the present invention, the plurality of ultraviolet lamp tubes 23 aligned parallel to each other, extend in the second direction X, and are arranged in parallel at a plurality of different intervals in the first direction Y.

As shown in FIG. 3 and FIG. 4, in an embodiment of the present invention, the plurality of slide rails 22 are an even number of slide rails 22, adjacent even-numbered ones 22a of the slide rails 22 constitute a first pair of the slide rails 22, and adjacent odd-numbered ones 22b of the slide rails 22 constitute a second pair of the slide rails 22, such that a plurality of pairs of the slide rails 22 aligned parallel to each other and extending in the first direction Y are defined; and wherein the opposite ends of the long axis of each of the plurality of ultraviolet lamp tubes 23 are respectively installed on any one of the first pair of the adjacent even-numbered ones 22a of the slide rails 22 and the second pair of the adjacent odd-numbered ones 22b of the slide rails 22 through the plurality of rollers 23a.

Still referring to FIG. 3 and FIG. 4, in an embodiment of the present invention, the plurality of ultraviolet lamp tubes 23 are divided into a plurality of groups, and the plurality of groups are installed in a one-to-one correspondence on the plurality of pairs of the adjacent even-numbered ones 22a of slide rails 22 and the adjacent odd-numbered ones 22b of the slide rails 22.

Still referring to FIG. 3 and FIG. 4, in an embodiment of the present invention, the even-numbered ones 22a of slide rails 22 and the odd-numbered ones 22b of slide rails 22 are staggered with each other along the first direction Y.

As shown in FIG. 3 and FIG. 4, in an embodiment of the present invention, adjacent ends of ultraviolet lamp tubes 23 in two adjacent ones of the groups are staggered with each other.

As shown in FIG. 3 and FIG. 4, in an embodiment of the present invention, the plurality of ultraviolet lamp tubes 23 are divided into at least a first group and a second group, the plurality of ultraviolet lamp tubes 23 of the first group and the plurality of ultraviolet lamp tubes 23 of the second group are respectively installed between different pairs of the adjacent even-numbered ones 22a of the slide rails 22 and the adjacent odd-numbered ones 22b of the slide rails 22, and the plurality of ultraviolet lamp tubes 23 of the first and second groups extend in the first direction Y and aligned parallel to each other in the second direction X.

In an embodiment of the present invention, the liquid crystal alignment device 200 further includes: an electric motor (not shown) configured to move the plurality of ultraviolet lamp tubes 23. In embodiments of the present invention, the plurality of ultraviolet lamp tubes 23 can be moved to adjust their intervals by manual operation or motor driving, wherein the intervals between the plurality of ultraviolet lamp tubes 23 can independently range from 1 mm to 400 mm.

Although in the liquid crystal alignment device according to the above embodiments of the present invention, description was made only by taking the ultraviolet lamp tubes for providing the liquid crystal alignment light source as an example, in other embodiments of the present invention, the plurality of ultraviolet lamp tubes 23 may also be replaced by at least one of a metal halide lamp, a mercury lamp, a fluorescent lamp, and a light emitting diode (LED) lamp.

In other embodiments of the present invention, the plurality of ultraviolet lamp tubes 23 of the liquid crystal alignment device may independently have two or more different illuminances at the same time, or all have a same illuminance.

In other embodiments of the present invention, the liquid crystal alignment device provided by the present invention may further serve as a secondary ultraviolet alignment device at the same time.

In an embodiment of the present invention, the liquid crystal alignment device 200 further includes a chamber (not shown) for accommodating various components described in the above embodiment, and a lamp holder (not shown) for mounting slide rails.

In an embodiment of the present invention, in the liquid crystal alignment device 200, the plurality of ultraviolet lamp tubes 23 can be moved by manual operation or motor driving.

Still referring to FIG. 3 and FIG. 4, according to another embodiment of the present invention, the present invention yet provides a method of operating the liquid crystal alignment device 200. As shown in FIG. 3 and FIG. 4, specifically, the method of operating the liquid crystal alignment device 200 provided by the embodiment of the present invention includes: adjusting the plurality of ultraviolet light tubes to have at least a first interval D1 in the first direction Y when the liquid crystal substrate 20 is required to be irradiated with the ultraviolet lamp tubes of a first illuminance for liquid crystal alignment; and adjusting the plurality of ultraviolet light tubes to have at least a second interval D2 in the first direction Y when the liquid crystal substrate 20 is required to be irradiated with the ultraviolet lamp tubes of a second illuminance for liquid crystal alignment, wherein when the first illuminance is greater than the second illuminance, the first interval D1 is smaller than the second interval D2, and when the first illuminance is less than the second illuminance, the first interval D1 is greater than the second interval D2.

With continued reference to FIG. 3 and FIG. 4, in an embodiment of the present invention, the method of operating the liquid crystal alignment device includes: adjusting the plurality of ultraviolet light tubes corresponding to the liquid crystal substrate to have the first interval D1 in the first direction Y, and adjusting the plurality of ultraviolet light tubes non-corresponding to the liquid crystal substrate to have a third interval D3 when the liquid crystal substrate is required to be irradiated with the ultraviolet lamp tubes of the first illuminance for liquid crystal alignment; and adjusting the plurality of ultraviolet light tubes to have the second interval D2 in the first direction Y when the liquid crystal substrate is required to be irradiated with the ultraviolet lamp tubes of the second illuminance for liquid crystal alignment, wherein the first illuminance is less than the second illuminance, and the first interval D1 is greater than each of the second interval D2 and the third interval D3.

Accordingly, the present invention provides a liquid crystal ultraviolet alignment device with controllable illuminance and an operation method thereof. By setting adjustable and movable lamp tubes in the ultraviolet alignment device, and by controlling movements of the lamp tubes, intervals between the lamp tubes can be changed to adjust an intensity the illuminance, thereby complying with different illuminations required by different production conditions, and a variety of production requirements can be achieved with one device, thus saving operating costs.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A liquid crystal alignment device, comprising:
   a stage configured to carry a liquid crystal substrate;
   a plurality of slide rails aligned parallel to each other, extending in a first direction and arranged above the stage;
   a plurality of rollers respectively installed on the plurality of slide rails; and
   a plurality of ultraviolet lamp tubes aligned parallel to each other and extending in a second direction, wherein opposite ends of a long axis of each of the plurality of ultraviolet lamp tubes are respectively installed on any two of the plurality of slide rails through the plurality of rollers, such that the plurality of ultraviolet lamp tubes have adjustable intervals in the first direction,
   wherein the second direction and the first direction are perpendicular to each other;
   the plurality of ultraviolet lamp tubes are aligned parallel to each other, extend in the second direction, and are arranged in parallel at a plurality of different intervals in the first direction;
   the plurality of slide rails are an even number of slide rails, wherein adjacent even-numbered ones of the slide rails constitute a first pair of the slide rails, and adjacent odd-numbered ones of the slide rails constitute a second pair of the slide rails, such that a plurality of pairs of the slide rails aligned parallel to each other and extending in the first direction are defined; and
   the opposite ends of the long axis of each of the plurality of ultraviolet lamp tubes are respectively installed on any one of the first pair of the adjacent even-numbered ones of the slide rails and the second pair of the adjacent odd-numbered ones of the slide rails through the plurality of rollers.

2. The liquid crystal alignment device according to claim 1, wherein the plurality of ultraviolet lamp tubes are divided into a plurality of groups, and the plurality of groups are installed in a one-to-one correspondence on the plurality of pairs of the adjacent even-numbered ones of slide rails and the adjacent odd-numbered ones of the slide rails.

3. The liquid crystal alignment device according to claim 2, wherein the even-numbered ones of slide rails and the odd-numbered ones of slide rails are staggered with each other along the first direction.

4. The liquid crystal alignment device according to claim 3, wherein adjacent ends of ultraviolet lamp tubes in two adjacent ones of the groups are staggered with each other.

5. The liquid crystal alignment device according to claim 1, wherein the plurality of ultraviolet lamp tubes are divided into at least a first group and a second group, the plurality of ultraviolet lamp tubes of the first group and the plurality of ultraviolet lamp tubes of the second group are respectively installed between different pairs of the adjacent even-numbered ones of the slide rails and the adjacent odd-numbered ones of the slide rails, and the plurality of ultraviolet lamp tubes of the first and second groups extend in the first direction and aligned parallel to each other in the second direction.

6. The liquid crystal alignment device according to claim 1, further comprising: an electric motor configured to move the plurality of ultraviolet lamp tubes.

7. A liquid crystal alignment device, comprising:
   a stage configured to carry a liquid crystal substrate;
   a plurality of slide rails aligned parallel to each other, extending in a first direction and arranged above the stage;
   a plurality of rollers respectively installed on the plurality of slide rails; and
   a plurality of ultraviolet lamp tubes aligned parallel to each other and extending in a second direction, and opposite ends of a long axis of each of the plurality of ultraviolet lamp tubes are respectively installed on any two of the plurality of slide rails through the plurality of rollers, such that the plurality of ultraviolet lamp tubes have adjustable intervals in the first direction, wherein the second direction and the first direction are perpendicular to each other.

8. The liquid crystal alignment device according to claim 7, wherein the plurality of ultraviolet lamp tubes aligned parallel to each other, extend in the second direction, and are arranged in parallel at a plurality of different intervals in the first direction.

9. The liquid crystal alignment device according to claim 7, wherein the plurality of slide rails are an even number of slide rails, adjacent even-numbered ones of the slide rails constitute a first pair of the slide rails, and adjacent odd-numbered ones of the slide rails constitute a second pair of the slide rails, such that a plurality of pairs of the slide rails aligned parallel to each other and extending in the first direction are defined; and
   wherein the opposite ends of the long axis of each of the plurality of ultraviolet lamp tubes are respectively installed on any one of the first pair of the adjacent even-numbered ones of the slide rails and the second pair of the adjacent odd-numbered ones of the slide rails through the plurality of rollers.

10. The liquid crystal alignment device according to claim 9, wherein the plurality of ultraviolet lamp tubes are divided into a plurality of groups, and the plurality of groups are installed in a one-to-one correspondence on the plurality of pairs of the adjacent even-numbered ones of slide rails and the adjacent odd-numbered ones of the slide rails.

11. The liquid crystal alignment device according to claim 10, wherein the even-numbered ones of slide rails and the odd-numbered ones of slide rails are staggered with each other along the first direction.

12. The liquid crystal alignment device according to claim 11, wherein adjacent ends of ultraviolet lamp tubes in two adjacent ones of the groups are staggered with each other.

13. The liquid crystal alignment device according to claim 9, wherein the plurality of ultraviolet lamp tubes are divided into at least a first group and a second group, the plurality of ultraviolet lamp tubes of the first group and the plurality of ultraviolet lamp tubes of the second group are respectively installed between different pairs of the adjacent even-numbered ones of the slide rails and the adjacent odd-numbered ones of the slide rails, and the plurality of ultraviolet lamp tubes of the first and second groups extend in the first direction and aligned parallel to each other in the second direction.

14. The liquid crystal alignment device according to claim 7, further comprising: an electric motor configured to move the plurality of ultraviolet lamp tubes.

15. A method of operating the liquid crystal alignment device according to claim 7, comprising:
   adjusting the plurality of ultraviolet light tubes to have at least a first interval in the first direction when the liquid crystal substrate is required to be irradiated with the ultraviolet lamp tubes of a first illuminance for liquid crystal alignment; and
   adjusting the plurality of ultraviolet light tubes to have at least a second interval in the first direction when the liquid crystal substrate is required to be irradiated with the ultraviolet lamp tubes of a second illuminance for liquid crystal alignment,
   wherein when the first illuminance is greater than the second illuminance, the first interval is smaller than the second interval, and when the first illuminance is less than the second illuminance, the first interval is greater than the second interval.

16. The method of operating the liquid crystal alignment device according to claim 15, comprising:
   adjusting the plurality of ultraviolet light tubes corresponding to the liquid crystal substrate to have the first interval in the first direction, and adjusting the plurality of ultraviolet light tubes non-corresponding to the liquid crystal substrate to have a third interval when the liquid crystal substrate is required to be irradiated with the ultraviolet lamp tubes of the first illuminance for liquid crystal alignment; and
   adjusting the plurality of ultraviolet light tubes to have the second interval in the first direction when the liquid crystal substrate is required to be irradiated with the ultraviolet lamp tubes of the second illuminance for liquid crystal alignment,
   wherein the first illuminance is less than the second illuminance, and the first interval is greater than each of the second interval and the third interval.

* * * * *

UNITED STATES PATENT AND TRADEMARK OFFICE
CERTIFICATE OF CORRECTION

PATENT NO. : 11,169,418 B1
APPLICATION NO. : 16/627787
DATED : November 9, 2021
INVENTOR(S) : Rentang Zhao Page 1 of 1

It is certified that error appears in the above-identified patent and that said Letters Patent is hereby corrected as shown below:

On the Title Page

Item (73) Assignee, "TCL China Star Optoelectrenics Technology Co., Ltd." should be changed to -- TCL China Star Optoelectronics Technology Co., Ltd. --

Signed and Sealed this
Twenty-sixth Day of April, 2022

Katherine Kelly Vidal
*Director of the United States Patent and Trademark Office*